United States Patent
Haun et al.

(10) Patent No.: US 7,880,333 B1
(45) Date of Patent: *Feb. 1, 2011

(54) METHOD FOR WEATHER RESISTANT PORTABLE FLOW METERING

(75) Inventors: Darrell N. Haun, Sugar Land, TX (US); Donald N. Haun, Stafford, TX (US)

(73) Assignee: Solarcraft, Inc., Stafford, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/727,823

(22) Filed: Mar. 19, 2010

Related U.S. Application Data

(63) Continuation-in-part of application No. 12/396,984, filed on Mar. 3, 2009, now Pat. No. 7,750,502.

(51) Int. Cl.
*H02J 9/00* (2006.01)
(52) U.S. Cl. .......................... 307/64; 307/66
(58) Field of Classification Search ............. 307/64, 307/66
See application file for complete search history.

(56) References Cited

U.S. PATENT DOCUMENTS

| | | |
|---|---|---|
| 5,335,730 A | 8/1994 | Cotham, III |
| 5,757,283 A | 5/1998 | Janoska |
| 7,750,502 B1 * | 7/2010 | Haun et al. ............ 307/64 |
| 2003/0192675 A1 | 10/2003 | Cosley et al. |
| 2006/0239777 A1 | 10/2006 | Martin |
| 2007/0010916 A1 | 1/2007 | Rodgers et al. |
| 2007/0171888 A1 | 7/2007 | Adams |

* cited by examiner

*Primary Examiner*—Fritz M Fleming
(74) *Attorney, Agent, or Firm*—Buskop Law Group, PC; Wendy Buskop

(57) ABSTRACT

A method for low voltage flow control, which includes creating an enclosure with a body and a movable door. The enclosure can include a bulkhead forming a top compartment and a bottom compartment, a back plane for supporting electronic equipment, and lifting eyes secured to the enclosure. The method can include disposing batteries in the bottom compartment. A wireless communication unit and a remote terminal unit can be installed on the back plane and can be connected to the batteries. An uninterruptable power supply, an A/C terminal low voltage distribution, and a DC-DC converter can be installed on the back plane. A flow controller can also be installed on the back plane and can be in communication with the A/C terminal, the remote terminal unit, and the wireless communication unit for monitoring and regulating flow control through the enclosure.

12 Claims, 4 Drawing Sheets

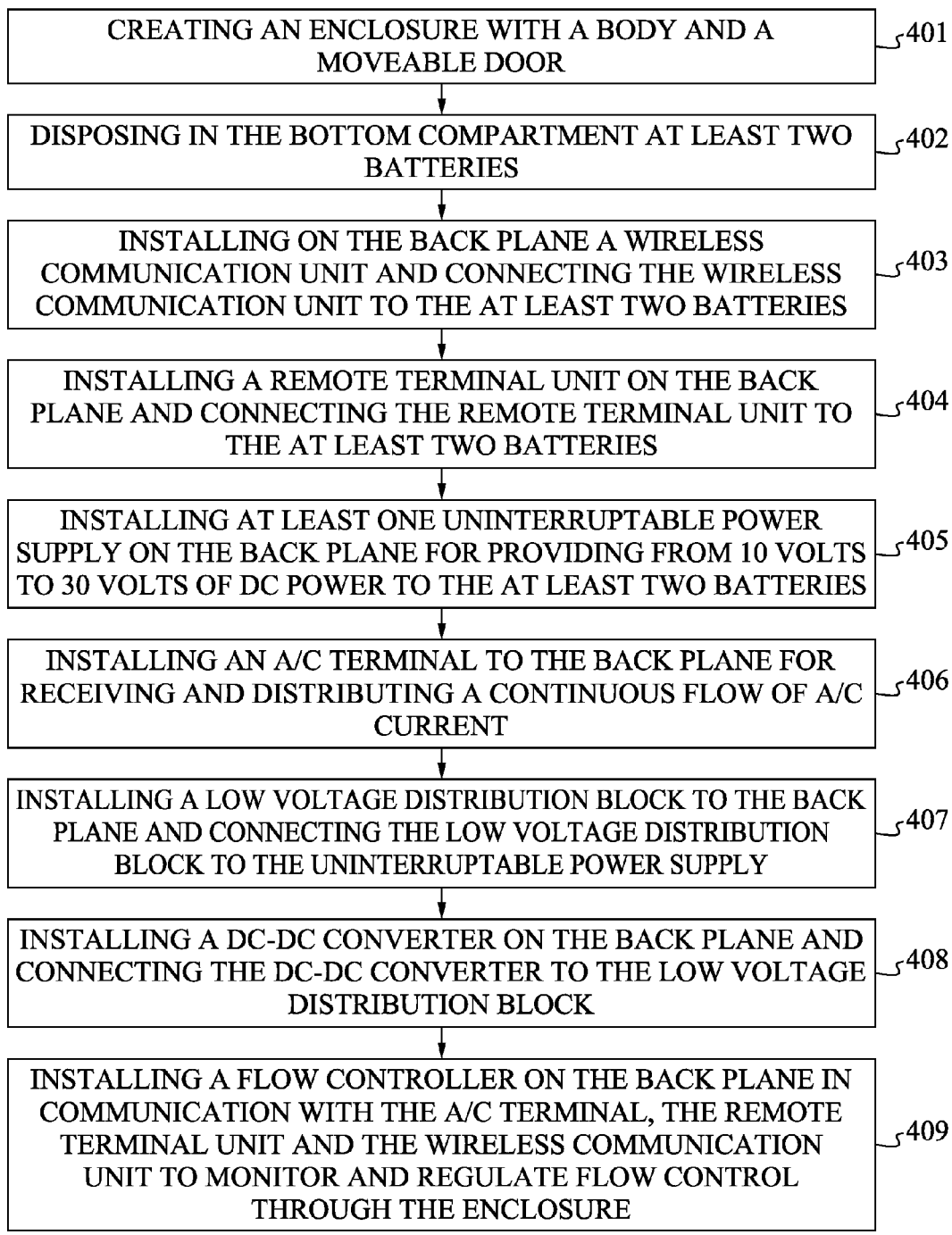

METHOD FOR WEATHER RESISTANT PORTABLE FLOW METERING

CROSS REFERENCE TO RELATED APPLICATIONS

The present application is a Continuation in Part of co-pending U.S. patent application Ser. No. 12/396,984 filed on Mar. 3, 2009, entitled "Portable Weather Resistant Flow Meter System". This reference is hereby incorporated in its entirety.

FIELD

The present embodiments generally relate to a method for providing flow metering that can use a flow meter system that is tough, weather-resistant and liftable without deformation for use in the field, particularly in harsh environments.

BACKGROUND

A need exists for a method that can use a sturdy flow meter which can communicate wirelessly to a network and can be used instantly in the field.

A further need exists for a highly reliable flow metering method using a remote terminal unit that can be easy and fast and can be implemented without requiring a large technical support crew in a hazardous environment.

The present embodiments meet these needs.

BRIEF DESCRIPTION OF THE DRAWINGS

The detailed description will be better understood in conjunction with the accompanying drawings as follows:

FIG. 4 depicts a flow diagram of an embodiment of the method.

Figure 1:
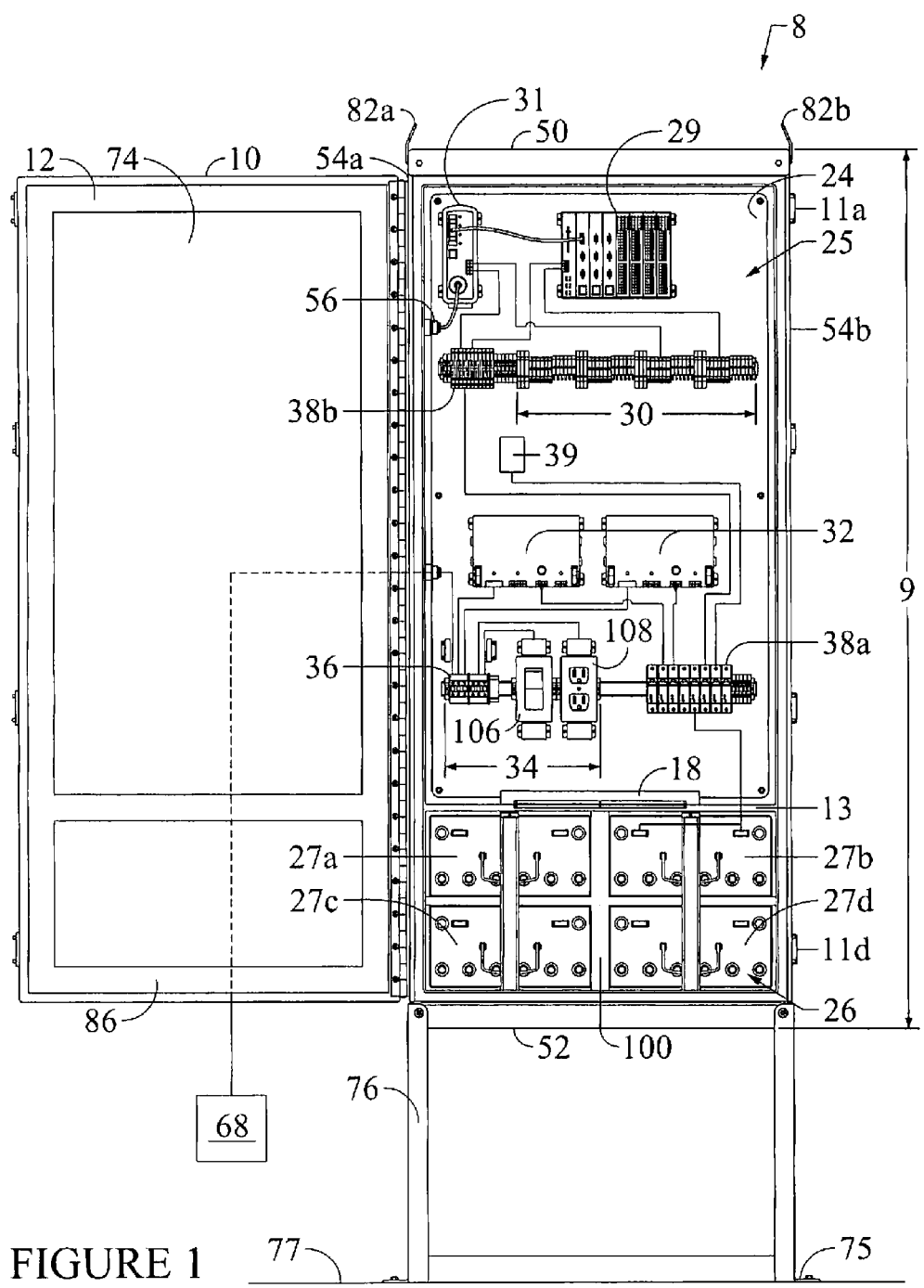
FIG. 1 illustrates a front view of a flow meter enclosure with a door open usable in performing the method.

The present embodiments are detailed below with reference to the listed Figures.

DETAILED DESCRIPTION OF THE EMBODIMENTS

Before explaining the present method in detail, it is to be understood that the method is not limited to the particular embodiments and that it can be practiced or carried out in various ways.

The present embodiments relate to a portable weather resistant flow control method which can be charged using a solar array.

The method for flow metering can use a flow control enclosure, which can be made from powder coated metal.

The flow control enclosure can have a body and a movable door that can be adapted to engage the body. The body can generally be a rectangular box with the movable door hinged to the body and overlapping the walls of the rectangular box. The movable door can be removable from the body and can be attachable to the body with a plurality of fasteners. For example, two fasteners can be used for two opposing walls.

The body, which can be square or rectangular, can have five walls. Each wall can have an outer side and an inner side. One of the walls can form a base.

In one or more embodiments, the body can be oval or circular in shape and can include two or three walls, with one wall being the bottom or base.

In embodiments at least one movable door fastener can be used to secure each wall to the movable door.

In embodiments, the body can be about 54 inches high, about 54 inches wide, and about 28 inches deep. The body can be made from a powder coated aluminum, which can have a thickness of aluminum of from about ⅛ of an inch to about ⅜ of an inch.

In one or more embodiments, the movable door can be the same height and width as the body, and can have an overhanging lip of up to several inches, enabling the movable door to cover an open portion of the body and to cover part of any wall that forms the portions of the body engaging the movable door. The movable door can be formed at least partially of powder coated aluminum with a thickness of aluminum of from about ⅛ of an inch to about 3/16 of an inch.

The movable door can include a door extension for providing access to some components within the enclosure without requiring the movable door to be unlatched, therefore without requiring exposure of every element to a potentially harsh environment.

A seal, such as a rubber gasket, can be fastened to the movable door to provide a weather-tight sealing engagement with the body, such that no water, steam, sand, or other undesirable materials can penetrate or otherwise get inside of the enclosure. The seal can have a width of about 1 inch and a thickness of about 0.25 inches.

A flow controller can be positioned within the door extension or can be disposed within the body.

Examples flow controllers for flow metering according to the method can include a unit available from Daniels™ of Houston, Tex. or a unit available from Fisher Scientific.

A remote terminal unit "RTU" monitoring controller can also be disposed in the door extension and can be in communication with the flow meter.

In one or more embodiments the RTU monitoring controller can include a voltmeter for determining the voltage generated by a solar array.

In embodiments of the method, the flow controller can be positioned on a back plane and bolted to the back plane. Parts of the flow controller can be easily removed from the back plane for repair or maintenance if needed.

The back plane can be removably secured to the body of the enclosure and can be secured to the back of the enclosure within the body.

A pedestal can be used for maintaining the flow control enclosure above a surface, such as the ground, in case of flooding, such that none of the tanks or other equipment are exposed to drifting sands, flood waters, or other elements including wildlife.

A first lifting eye can be riveted, welded, bolted, or otherwise fastened or connected to a first wall of the body. A second lifting eye can be similarly connected to a second wall opposite the first lifting eye. This configuration can enable a crane, such as a pedestal crane, to lift the portable weather-resistant flow control system with all of the equipment mounted within it without deforming the flow control enclosure.

Non-deforming lifting of such heavy and calibrated equipment without damage is needed in the field. The present embodiments teach a method that is more reliable than other flow control systems with less protection, while simultaneously providing portability in the field with significant protection.

In embodiments, a flange can be riveted, welded, bolted, or otherwise fastened or connected to one of the walls. The flange can encircle the walls, like a small frame on top of the body. The flange can also be used to support the first and second lifting eyes. The flange can have lifting holes, which can be drilled into it, for lifting of the portable weather resistant flow control system without using the lifting eyes. The flange can prevent deformation of the enclosure by providing extra support. The flange, when attached to the bottom of the enclosure, can keep the enclosure off of the ground, thereby preventing contamination from leaking ground water or mud.

A foldable tray, or foldable computer tray, can be mounted to the body on the inside for supporting a computer. The foldable computer tray can be sized to accommodate portable computing devices such as laptops. The foldable computer tray can fold out from the body, thereby providing a unique space-saving feature.

The method is unique in-part because, with a solar array attached to the enclosure for charging the batteries, the method provides continuous low voltage power to other field sources from an A/C power source while simultaneously providing flow metering. If the A/C power source fails, the method provides continuous operation using the batteries for at least about 48 hours.

The method for low voltage flow control can include creating an enclosure with a body and a movable door. The enclosure can have a bulkhead disposed in the body, forming a top compartment and a bottom compartment, a back plane mounted to the bulkhead within the top compartment for supporting electronic equipment, and at least two lifting eyes secured to the enclosure.

The method can include disposing in the bottom compartment at least two batteries, such as two car batteries.

The method can include installing a wireless communication unit on the back plane and connecting the wireless communication unit to the at least two batteries.

After the wireless communication unit is installed, a remote terminal unit can be installed on the back plane and connected to the at least two batteries.

Next, at least one uninterruptable power supply can be installed on the back plane for providing between 10 volts and 30 volts of D/C power to the at least two batteries.

An A/C terminal can be installed to the back plane for receiving and distributing a continuous flow of A/C current. A low voltage distribution block can be installed to the back plane and can be connected to the power supply, which can be an uninterruptable power supply.

After the A/C terminal is installed, a DC-DC converter can be attached on the back plane and can be connected to the low voltage distribution block.

A flow controller can be connected on the back plane and can be in communication with the A/C terminal, the remote terminal unit, and the wireless communication unit to monitor and regulate flow control through the enclosure.

Additional method steps can include sealing electronic equipment in the top compartment, using up to eight batteries in the enclosure body, and using a fastener to secure the movable door to the enclosure.

One or more embodiments can include additionally using a door extension to house the remote terminal unit and the flow controller in communication with the A/C terminal assembly and at least one piece of field equipment. A viewing port can be formed in the door extension that can be in communication with the A/C terminal assembly and the power supply.

A switch can be used between the power supply and the A/C terminal assembly.

In embodiments of the method utilizing a solar array, the solar array can be attached to the enclosure for receiving and distributing a continuous flow of electric current to the remote terminal unit and to the flow controller. At least one voltmeter can be used for tracking voltage produced by the solar array. At least one indicator can be used for illuminating the areas in the enclosure when the solar array is charging.

The method can include using a surge protector mounted on the back plane for protecting the A/C terminal assembly from power surges from the A/C power source.

An input/output (I/O) termination assembly can be mounted to the back plane. The I/O termination assembly can provide connections for at last one piece of field equipment to the remote terminal unit.

The method can include forming an outlet plug between the A/C terminal assembly and the uninterruptable power supply to allow field equipment to charge in a remote location while flow control monitoring. Field equipment can include a cell phone, a video monitor for security purposes, and other similar devices that allow remote monitoring of the enclosure with flow meter from a position of safety. For example, remote monitoring can be beneficial if the enclosure with the flow meter is installed in a war zone, such as Iraq, where flow metering is greatly needed and where contractors need to be protected from being targets of war zone dangers.

The flow meter can connect or be in communication with the internet with a satellite network for continuous 24 hours a day, 7 days a week monitoring from the portable unit and can be mounted to a trailer with wheels or skid mounted.

Turning now to the figures, FIG. 1 depicts a portable self contained weather resistant low voltage flow control system having a flow control enclosure 8 including a body 9 with a movable door 10 mounted atop a pedestal 76.

The pedestal 76 can include a pedestal flange 75 for mounting the flow control enclosure on a surface 77.

The movable door 10 is illustrated in the open position, but can be closed and secured with movable door fasteners 11a and 11d.

A seal 12 can be located on the inner side of the movable door 10, which can provide a means for keeping elements such as sand and rainwater out of the interior of the flow control enclosure 8.

The body 9 can include a top 50, a bottom 52, and sides 54a and 54b, which can each be covered completely or partially with insulation 74.

A bulkhead 13 can be disposed in the body 9, forming a top compartment 25 and a bottom compartment 26.

Batteries 27a, 27b, 27c, and 27d are shown stored in the bottom compartment 26 and can fit into respective spaces formed by separator 100. The bottom compartment 26 can be sealed by bottom seal 86 on the movable door 10.

A back plane 24 can be mounted to at least the bulkhead 13 within the top compartment 25 for supporting electronics equipment.

One or more embodiments of the flow control method that uses this enclosure can provide from about 12 volts to about 24 volts of power continuously to the remote terminal unit 29 and to the wireless communication unit 31 while providing continuous communication for at least intermittent monitoring of field equipment.

An input/output (I/O) termination assembly 30 can be mounted to the back plane 24. The I/O termination assembly 30 can provide connections for at least one piece of field equipment to the remote terminal unit 29. The connected piece of field equipment can provide measurements or data for storage on the remote terminal unit 29 and transmission by the wireless communications unit 31.

The wireless communications unit 31 can be mounted to the back plane 24 and can be connected to the wireless communication unit 31. The wireless communication unit 31 can take data from the remote terminal unit 29 and can transmit that data, via radio frequencies, to receivers located remotely from the flow control enclosure 8.

An A/C terminal assembly 34 can be connected to an external A/C power source 68 through a surge protector 36 in order to protect the A/C terminal assembly 34 from power surges. The A/C terminal assembly 34 can further be mounted to the back plane 24 for receiving and distributing a continuous flow of A/C current from the A/C power source 68 to at least one uninterruptable power supply 32 (DC-UPS).

The at least one uninterruptable power supply 32 can be mounted to the back plane 24 for providing from about 10 volts to about 30 volts of D/C power to the batteries 27a-27d. The uninterruptable power supply 32 can be connected to the batteries through a low voltage distribution block 38a.

The low voltage distribution block 38a can be mounted to the back plane 24 and can be in communication with a second low voltage distribution block 38b. The second low voltage distribution 38b block can provide power to the wireless communications unit 31 and the remote terminal unit 29.

A DC-DC converter 39 can be mounted to the back plane 24 and can also communicate with the low voltage distribution block 38a.

At least two removable lifting eyes 82a and 82b can be secured to the enclosure for lifting of the flow control enclosure 8 by a crane.

A foldable computer tray 18 can be located in the upper compartment 25 and can provide a means for supporting a portable computer such as a laptop.

Also shown is a switch 106, which can be in communication with the AC terminal assembly 34 and the uninterruptable power supply 32 (DC-UPS).

An outlet 108 is illustrated in communication with the AC terminal assembly 34. The outlet can be from about a 110 volt outlet to about a 220 volt outlet.

In one or more embodiments, the wireless communication unit 31, remote terminal unit 29, I/O termination assembly 30, uninterruptable power supply 32, A/C terminal assembly 34, surge protector 36, low voltage distribution block 38a, and converter 39 can be disposed on the back plane 24 and can be in a sealed watertight, water resistant top compartment.

One or more embodiments can include a ground fault interrupter 56 that can be disposed between the A/C terminal assembly 34 and the uninterruptable power supply 32 (DC-UPS).

Figure 2:
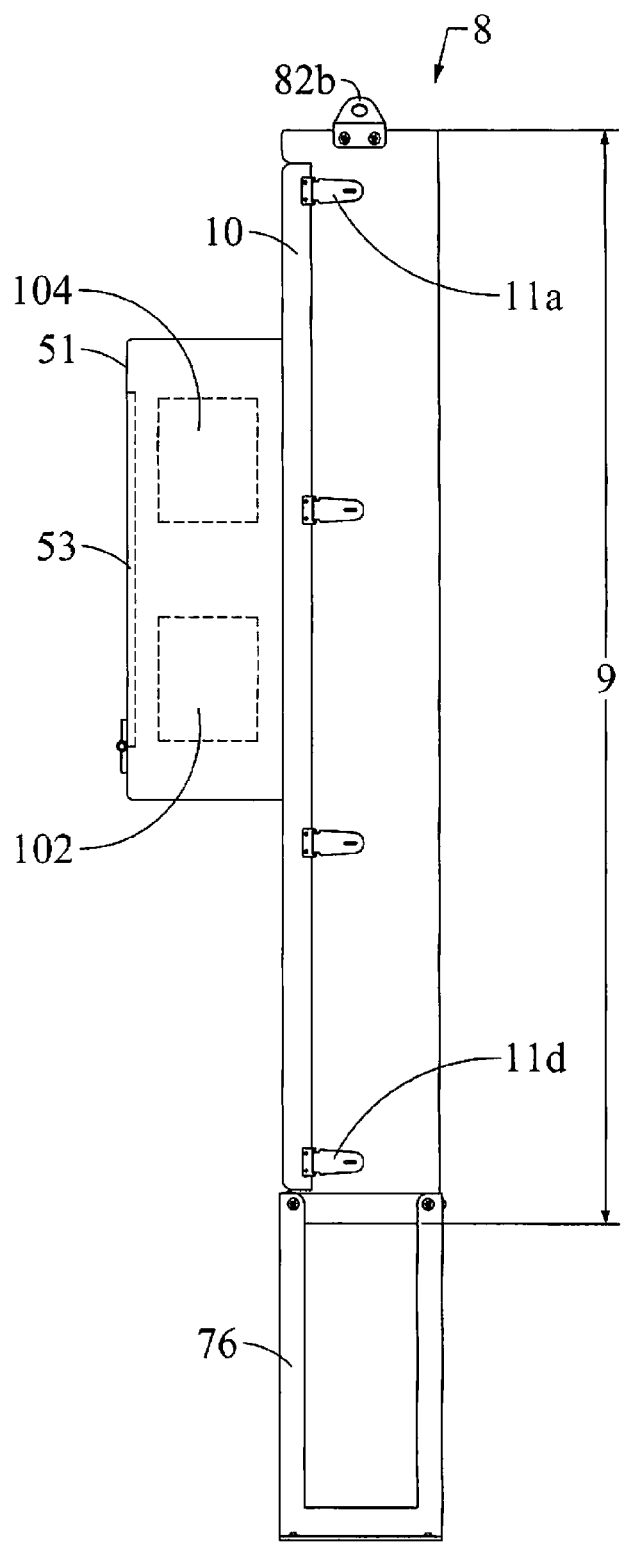
FIG. 2 illustrates a view of the door including a door extension in accordance with certain embodiments usable in the method.

FIG. 2 illustrates a side view of a usable flow control enclosure 8 with the body 9.

The movable door 10 is depicted in a closed position mounted on the pedestal 76.

In the embodiment depicted, a door extension 51 is shown in the movable door 10. The door extension 51 can include a viewing port 53. The viewing port 53 can further include a hinged surface which can provide access to the interior of the door extension.

The door extension 51 can be adapted to house a remote terminal unit monitoring controller 102, such as one made by Bristol, which can be in communication with the remote terminal unit 29.

The door extension 51 can also house a flow controller 104, such as Daniel 2358A or one made by Omni Products, Inc., which can be in communication with the A/C terminal assembly 34 and at least one piece of field equipment.

The remote terminal unit monitoring controller 102 can further comprise a voltmeter for tracking voltage produced by the solar array. An example of a voltmeter can be a Morningstar Sunsaver 10 solar controller ss-10L-24 volt.

Also shown is the second lifting eye 82b, which can provide a balanced means for lifting and moving the flow control enclosure 8.

The movable door 10 is shown attached to the body 9 of the flow control enclosure 8 with fasteners 11a and 11d.

Figure 3:
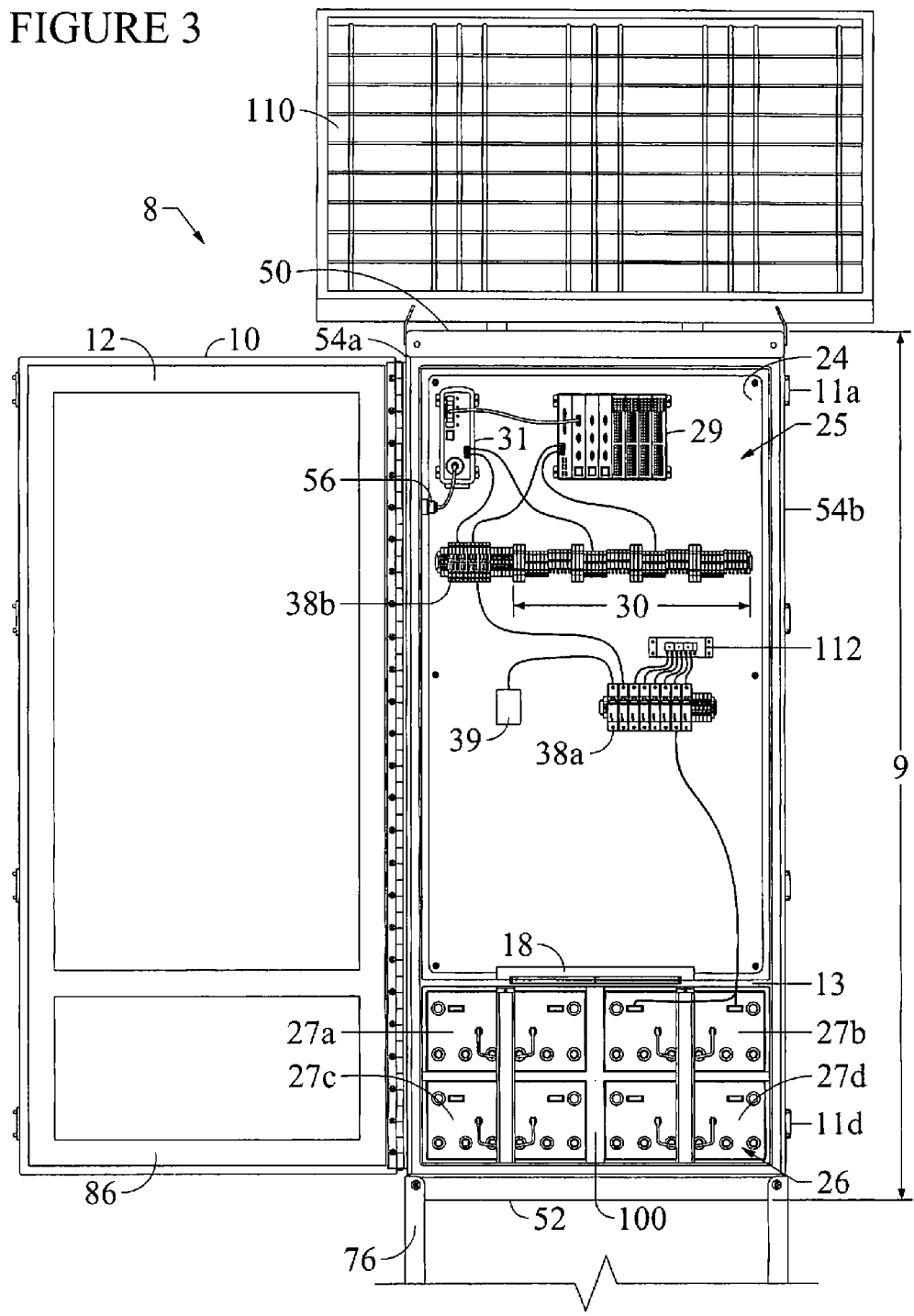
FIG. 3 illustrates a front view of an embodiment of equipment usable with the method including a solar array as a source of power.

FIG. 3 illustrates another embodiment of the present method utilizing solar power to keep the batteries continuously charged. A solar array 110 is illustrated in communication with the flow control enclosure 8.

A body 9 can be mounted on a pedestal 76. The body 9 can have a top 50, a bottom 52, and walls 54a and 54b. The body 9 can be enclosed by a movable mounted door 10. The movable door 10 can include a seal 12 and a bottom seal 86 for providing a weather tight seal with the body 9. The movable door 10 can be securely shut with movable door fasteners 11a and 11d.

A bulkhead 13 can separate a top compartment 25 and a bottom compartment 26, with batteries 27a, 27b, 27c, and 27d stored in the bottom compartment 26. The batteries are shown fit into respective spaces formed by the separator 100, which can form up to about 8 spaces for about 8 batteries. The bottom compartment 26 can be sealed by bottom seal 86 on the movable door 10.

The top compartment 25 can include a back plane 24, which can be mounted to at least the bulkhead 13 within the top compartment 25 for supporting electronic equipment.

A wireless communication unit 31 can be mounted to the back plane 24. The wireless communication unit 31 can be connected with the batteries 27a-27d.

The remote terminal unit 29, the wireless communication unit 31, and the input/output (I/O) termination assembly 30 can work in much the same way as described with respect to FIG. 1, such as for storing and transmitting data received from pieces of equipment in the field.

The remote terminal unit 29 can be mounted to the back plane 24 and can be in communication with the wireless communication unit 31 and the batteries. The remote terminal unit can communicate data to the wireless communication unit for transmission via radio frequency.

The I/O termination assembly 30 can be mounted to the back plane 24 and can provide connections for at least one piece of field equipment to the remote terminal unit 29.

A solar controller 112 can be in communication with a low voltage distribution block 38a, which can be mounted to the back plane 24. The low voltage distribution block 38a can receive power from the solar array 110 and can distribute power to a DC-DC converter 39, to the batteries 27a, 27b, 27c, 27d, and to a second low voltage distribution block 38b. The second low voltage distribution block 38b can power the remote terminal unit 29, the wireless communications unit 31, and the batteries 27a, 27b, 27c, 27d.

The DC-DC converter 39 can be mounted to the back plane 24 and can be connected to the low voltage distribution block 38a.

The ground fault interrupter 56 can be in communication with the wireless communication unit 31.

The method can be operated using a solar array.

In one or more embodiments, the solar array 110 can supply from about 10 volts to about 30 volts of power using photovoltaics. Photovoltaics are generally known as the field of technology and research related to the application of solar cells for energy by converting sunlight directly into electricity.

Solar power can be extremely beneficial for this method due to the growing demand for clean sources of energy. The manufacture of solar cells and photovoltaic arrays has expanded dramatically in recent years One or more embodiments provide a method for flow metering using a durable flow control enclosure, which can further have an advantage in that no external source of power is necessarily required. The solar array can generate enough power to operate the system that can be used to implement the method.

In embodiments, the remote terminal unit monitoring controller can have an indicator, which can be an illuminating indicator.

In embodiments, the indicator can provide illuminations, sounds, visuals, or other means of providing an indication when the solar array is charging, when a load is disconnected, or combinations thereof.

FIG. 4 depicts a flow chart of steps of an embodiment of a method for low voltage flow control.

Step 401 can include creating an enclosure with a body and a movable door.

Step 402 can include disposing in the bottom compartment at least two batteries.

Step 403 can include installing on the back plane a wireless communication unit and connecting the wireless communication unit to the at least two batteries.

Step 404 can include installing a remote terminal unit on the back plane and connecting the remote terminal unit to the at least two batteries.

Step 405 can include installing at least one uninterruptable power supply on the back plane for providing from 10 volts to 30 volts of DC power to the at least two batteries.

Step 406 can include installing an A/C terminal to the back plane for receiving and distributing a continuous flow of AC current.

Step 407 can include installing a low voltage distribution block to the back plane and connecting the low voltage distribution block to the uninterruptable power supply.

Step 408 can include installing a DC-DC converter on the back plane and connecting the DC-DC converter to the low voltage distribution block.

Step 409 can include installing a flow controller on the back plane in communication with the A/C terminal, the remote terminal unit and the wireless communication unit to monitor and regulate flow control through the enclosure.

While these embodiments have been described with emphasis on the embodiments, it should be understood that within the scope of the appended claims, the embodiments might be practiced other than as specifically described herein.

What is claimed is:

1. A method for low voltage flow control comprising:
   a. creating an enclosure with a body and a movable door, wherein the enclosure further comprises:
      i. a bulkhead disposed in the body forming a top compartment and a bottom compartment;
      ii. a back plane mounted to the bulkhead within the top compartment for supporting electronic equipment; and
      iii. at least two lifting eyes secured to the enclosure;
   b. disposing in the bottom compartment at least two batteries;
   c. installing on the back plane a wireless communication unit and connecting the wireless communication unit to the at least two batteries;
   d. installing a remote terminal unit on the back plane and connecting the remote terminal unit to the at least two batteries;
   e. installing at least one uninterruptable power supply on the back plane for providing from ten volts to thirty volts of DC power to the at least two batteries;
   f. installing an A/C terminal to the back plane for receiving and distributing a continuous flow of A/C current;
   g. installing a low voltage distribution block to the back plane and connecting the low voltage distribution block to the uninterruptable power supply;
   h. installing a DC-DC converter on the back plane and connecting the DC-DC converter to the low voltage distribution block; and
   i. using a door extension to house a remote terminal unit monitoring controller and a flow controller in communication with the A/C terminal and at least one piece of field equipment, wherein the flow controller is in communication with the remote terminal unit and the wireless communication unit to monitor and regulate flow control through the enclosure.

2. The method of claim 1, further comprising sealing the electronic equipment in the top compartment.

3. The method of claim 1, further comprising using up to eight batteries in the body.

4. The method of claim 1, further comprising using a fastener to secure the movable door to the body.

5. The method of claim 1, further comprising using a viewing port in communication with the A/C terminal and the uninterruptable power supply.

6. The method of claim 5, further comprising using a switch between the uninterruptable power supply and the A/C terminal.

7. The method of claim 1, further comprising using a solar array attached to the enclosure for receiving and distributing a continuous flow of electric current to the remote terminal unit and the flow controller.

8. The method of claim 7, further comprising using at least one voltmeter for tracking voltage produced by the solar array.

9. The method of claim 8, further comprising using an indicator for illuminating when the solar array is charging, when the flow controller is disconnected, or combinations thereof.

10. The method of claim 1, further comprising using a surge protector mounted on the back plane for protecting the A/C terminal from power surges from an A/C power supply.

11. The method of claim 1, further comprising using an input/output termination assembly mounted to the back plane, wherein the input/output termination assembly provides connections for the at least one piece of field equipment to the remote terminal unit.

12. The method of claim 1, further comprising using an outlet plug disposed between the A/C terminal and the uninterruptable power supply.

* * * * *